United States Patent
Kawaguchi

(10) Patent No.: US 6,790,901 B2
(45) Date of Patent: Sep. 14, 2004

(54) FIBER-TREATING AGENT, GLASS FIBER AND RUBBER PRODUCT BOTH MADE WITH THE FIBER TREATING AGENT

(75) Inventor: Satoru Kawaguchi, Tsu (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/203,590

(22) PCT Filed: Feb. 9, 2001

(86) PCT No.: PCT/JP01/00937

§ 371 (c)(1),
(2), (4) Date: Feb. 20, 2003

(87) PCT Pub. No.: WO01/61101

PCT Pub. Date: Aug. 23, 2001

(65) Prior Publication Data

US 2003/0162884 A1 Aug. 28, 2003

(30) Foreign Application Priority Data

Feb. 15, 2000 (JP) ........................................ 2000-037135

(51) Int. Cl.[7] ................................................ C08K 3/40
(52) U.S. Cl. ........................ 524/494; 524/800; 523/400; 528/87; 65/376
(58) Field of Search ................................ 524/494, 800; 523/400; 528/87; 65/376

(56) References Cited

U.S. PATENT DOCUMENTS

| | | | | |
|---|---|---|---|---|
| 3,922,468 A | * | 11/1975 | Burke et al. ................. | 428/414 |
| 4,603,153 A | * | 7/1986 | Sobajima et al. ............ | 523/209 |
| 5,484,656 A | * | 1/1996 | Swisher et al. .............. | 428/378 |
| 5,739,196 A | * | 4/1998 | Jenkins et al. ............... | 524/460 |
| 5,811,491 A | * | 9/1998 | Jagawa et al. ................ | 525/71 |

FOREIGN PATENT DOCUMENTS

| | | | |
|---|---|---|---|
| EP | 320873 A | | 12/1988 |
| EP | 0320873 | * | 6/1989 |
| JP | 57-57420 B | | 12/1982 |
| JP | 1-207480 A | * | 8/1989 |
| JP | 1-221433 A | | 9/1989 |
| JP | 7-21129 B | | 3/1995 |

* cited by examiner

Primary Examiner—David W. Wu
Assistant Examiner—Henry S. Hu
(74) Attorney, Agent, or Firm—Frishauf, Holtz, Goodman & Chick, P.C.

(57) ABSTRACT

A glass fiber containing a fiber processing agent for increasing the surface strength of a rubber product, such as a rubber belt or a tire, and a rubber product containing the glass fiber. The fiber processing agent is comprised of a dispersion solution having a 2-component dispersoid including a rubber latex and an epoxy resin. By using the 2-component dispersoid solution comprised of the epoxy resin, which has excellent strength and also has excellent heat resistance and water resistance, and the rubber latex, which is flexible, a glass fiber and a rubber product can be obtained having greatly increased durability, without bringing about a drop in quality, even under a poor environment.

17 Claims, No Drawings

FIBER-TREATING AGENT, GLASS FIBER AND RUBBER PRODUCT BOTH MADE WITH THE FIBER TREATING AGENT

This application is a U.S. National Phase Application under 35 U.S.C. 371 of International Application No. PCT/JP01/00937 filed Feb. 9, 2001.

TECHNICAL FIELD

The present invention relates to a fiber processing agent, a glass fiber using the fiber processing agent, and a rubber product, and more specifically to a fiber processing agent that will increase the surface strength of a rubber product such as a rubber belt or a tire, a glass fiber using the fiber processing agent, and a rubber product as above containing the glass fiber.

BACKGROUND ART

In recent years, reinforcing fibers such as glass fiber cords have come to be widely used as a reinforcing material for reinforcing rubber products such as rubber belts and tires; however, there is a drawback that such a rubber product is repeatedly subjected to flexural stress, and hence flexural fatigue occurs leading to a drop in performance, and as a result the reinforcing material and the rubber matrix may break away from one another, and the reinforcing fibers may wear away, leading to a drop in strength being prone to occur; moreover, this phenomenon tends to be accelerated in particular by heat and moisture.

To prevent breaking away due to such flexural fatigue and thus obtain adequate reinforcement effects, it is thus necessary to strengthen the affinity and adhesion between the reinforcing fibers and the rubber, and hence the application of various fiber processing agents onto the surfaces of the reinforcing fibers has been carried out.

Various such fiber processing agents have already been proposed; for example, Japanese Laid-open Patent Publication (Kokai) No. 1-221433 discloses a fiber processing agent in which are used together a resorcinol-formaldehyde water-soluble condensate, a vinylpyridine-butadiene-styrene terpolymer latex, a dicarboxylated butadiene-styrene copolymer latex, and a chlorosulfonated polyethylene latex.

However, these days glass fibers are used in various applications; for example, in the case of use as a reinforcing material for a timing belt of a vehicle engine or the like, heat resistance and water resistance are required. As vehicle engines and the like have been made more compact and so on in recent years, this requirement has become more and more severe; in this situation, cases have started to arise in which it is difficult to meet the required quality in terms of heat resistance and water resistance with a conventional fiber processing agent as described above.

In view of this state of affairs, it is an object of the present invention to provide a fiber processing agent that exhibits excellent heat resistance and water resistance when attached to a glass fiber, a glass fiber treated with the fiber processing agent, and a rubber product that contains the glass fiber and thus has excellent durability even under a poor environment.

DISCLOSURE OF THE INVENTION

The present inventor carried out assiduous studies to obtain a fiber processing agent that does not bring about a drop in quality even under a poor environment, and as a result found that by using as a fiber processing agent a dispersion-type solution having as dispersoids an epoxy resin, which is excellent in terms of strength and also has excellent heat resistance and water resistance, and a rubber latex, which is flexible, a glass fiber and a rubber product can be obtained according to which durability can be greatly increased without bringing about a drop in quality even under a poor environment.

The present invention was accomplished based on this finding: a fiber processing agent according to the present invention is characterized by comprising a dispersion-type solution having a rubber latex and an epoxy resin as dispersoids.

According to the above fiber processing agent, because the fiber processing agent comprises a dispersion-type solution having a rubber latex and an epoxy resin as dispersoids, a fiber can be obtained that has a surface having ample density and elasticity and also has excellent heat resistance and water resistance.

Moreover, from the viewpoint of securing the density possessed by the epoxy resin and resistance to flexural fatigue when the fiber processing agent is used in a rubber product, it is preferable for the content of the rubber latex to be 35 to 95 wt %, and the content of the epoxy resin to be 5 to 65 wt %.

Moreover, a glass fiber according to the present invention is characterized by having a fiber processing agent as described above attached to the glass fiber in an amount of 10 to 40 wt % in terms of solids.

Because the above glass fiber has attached thereto 10 to 40 wt % in terms of solids of a fiber processing agent as described above, it is possible to attach the fiber processing agent to the fiber surface evenly and uniformly, and a glass fiber, according to which the fiber surface has ample density and elasticity, heat resistance is not degraded, and water resistance is excellent, can be obtained reliably.

Moreover, a rubber product according to the present invention is characterized by containing a glass fiber as described above.

Because the above rubber product contains the glass fiber, the rubber product can adequately withstand use in a poor environment of high temperature and high humidity, and hence the durability of a rubber product such as a timing belt can be improved.

BEST MODES FOR CARRYING OUT THE INVENTION

A detailed description will now be given of best modes for carrying out the present invention.

The fiber processing agent according to the present mode is constituted from a 2-component dispersoid system comprised of a rubber latex and an epoxy resin.

Epoxy resins have high strength, contract little upon curing, generally have good adhesiveness, impregnating ability, dimensional stability, water resistance and chemical resistance, and in particular have excellent electrical insulating ability; epoxy resins are thus used as adhesives, coating materials and various molded article materials such as laminate materials.

Consequently, in the case that an epoxy resin is used as a fiber processing agent, a strong, dense film is formed on the fiber surface, and hence the fiber can be protected from erosion due to heat and water from the outside. Moreover, in the case that the fiber processing agent contains a rubber latex, the film formed on the fiber surface will be flexible, and hence adequate performance will be exhibited even in applications in which flexural fatigue resistance is required.

Moreover, it is important that the fiber processing agent is substantially comprised of the 2-component dispersoid system; by constituting the fiber processing agent from the 2-component dispersoid system, it is possible to avoid the performance as described above from being cancelled out as would be the case if a third dispersoid were present. It should be noted, however, that well-known stabilizers, antidegradants, cross-linking agents and so on, which are not dispersoids, may be added within a range such that there are no adverse effects on the performance of the 2-component dispersoid system. Here, a range of 0.1 to 20.0 wt % relative to the total solid content of the fiber processing agent is preferable as the range such that there are no adverse effects.

The proportions in terms of solids out of the dispersoids in the fiber processing agent are preferably made to be 35 to 95 wt % for the rubber latex and 5 to 65 wt % for the epoxy resin. If the epoxy resin content is less than 5 wt %, then density, which is a property characteristic of the epoxy resin, will no longer be exhibited, whereas if the epoxy resin content exceeds 65 wt %, then the film formed on the fiber surface will become hard, and the flexural fatigue resistance will be insufficient. As described above, it is thus preferable to use the dispersoids such that the proportions in terms of solids out of the dispersoids are 35 to 95 wt % for the rubber latex and 5 to 65 wt % for the epoxy resin.

The weight percentages of the dispersoids are adjusted such that total of the weight percentage of the rubber latex and the weight percentage of the epoxy resin is 100%, i.e. such that if, for example, the rubber latex weight percentage is 35 wt %, then the epoxy resin weight percentage is 65 wt %.

Moreover, the concentration of solids in the fiber processing agent is preferably 10 to 40 wt %, more preferably 20 to 30 wt %. If the concentration of solids is less than 10 wt %, then attachment to the fiber will be insufficient, whereas if the concentration of solids exceeds 40 wt %, then control of the amount attached to the fiber will become difficult, attachment will not be uniform, and problems may arise in terms of performance. As described above, the concentration of solids in the fiber processing agent is thus preferably 10 to 40 wt %, more preferably 20 to 30 wt %.

There are no particular limitations on the method of applying the fiber processing agent onto fibers; for example, a so-called immersion method in which fiber strands are immersed in a treatment bath filled with the fiber processing agent, excess is removed, and then if necessary drying treatment is carried out can be used. The fibers that have been treated with the fiber processing agent are bundled together as appropriate, and twisting is carried out, thus forming fiber cords. The fiber cords are embedded in an unvulcanized rubber base material using a known method, and then heating and vulcanization are carried out under pressure.

A bisphenol type epoxy resin or a polyphenol type epoxy resin is preferable as the epoxy resin. In particular, in the case of a bisphenol type epoxy resin, a bisphenol A type or bisphenol F type epoxy resin is preferable. Moreover, in the case of a polyphenol type epoxy resin, a phenol novalac type, cresol novalac type, hydroquinone type, brominated novalac type, xylene-modified novalac type, phenol glyoxal type, tris-oxyphenyl-methane type, or bisphenol A novalac type epoxy resin is preferable. In terms of adhesiveness to the matrix rubber of the rubber product and versatility, it is preferable to use a bisphenol A type or phenol novalac type epoxy resin.

Moreover, as the rubber latex, a butadiene-styrene copolymer latex, a dicarboxylated butadiene-styrene copolymer latex, a vinylpyridine-butadiene-styrene terpolymer latex, a chlorosulfonated polyethylene latex and so on can be used.

Moreover, two or three of these types of rubber latex may be mixed together, in which case it is preferable to make the content of any one type 20 to 80 wt %.

As a dicarboxylated butadiene-styrene copolymer latex, one comprised of 20 to 80 wt % of butadiene, 5 to 70 wt % of styrene and 1 to 10 wt % of an ethylenic unsaturated dicarboxylic acid is preferable; examples are Nipol 2570X5 (made by ZEON Corporation) and JSR 0668 (made by Japan Synthetic Rubber Co., Ltd.).

Moreover, as a vinylpyridine-butadiene-styrene terpolymer latex, any of a large number of terpolymers well-known to persons skilled in the art can be used; for example, a rubber latex in which the contents of vinylpyridine, butadiene and styrene are 10 to 20 wt %, 60 to 80 wt % and 10 to 20 wt % respectively can be used. Specific examples are Nipol 2518FS (made by ZEON Corporation) and Pyratex (made by Sumitomo Naugatuck Co., Ltd.)

Moreover, as a chlorosulfonated polyethylene latex, a rubber latex in which the chlorine content is 25 to 43 wt % and the sulfur content is 1.0 to 1.5 wt % can be used; an example is Esprene (made by Sumitomo Chemical Co., Ltd.).

Moreover, there are also no particular limitations on the dispersion medium of the fiber processing agent; a normal organic solvent or water-based solvent can be used; for example, it is possible to dissolve the epoxy resin in an organic solvent such as toluene, add an appropriate dispersion medium to create an aqueous dispersion, and use this. As such a dispersion medium, EPOLSION HC17 and HC32 (made by Nippon NSC Ltd.) are available on the market.

There are also no particular limitations on the fibers treated with the fiber processing agent according to the present embobiment; the fiber processing agent can be applied to glass fibers, aramid fibers, nylon or polyethylene fibers and so on that have been used from hitherto as reinforcing materials for rubber products, but glass fibers are particularly suitable. Glass fibers have high tensile strength and heat resistance, and are also inexpensive, and hence have been widely used from hitherto as various reinforcing materials, although on the other hand the water resistance is poor, and there has been a fear in the past that if the surface of a glass fiber is scratched, then there may be a marked deterioration in performance.

However, by applying the fiber processing agent described above to a glass fiber, a film that has excellent water resistance and is also dense and flexible can be formed on the surface of the glass fiber. That is, the fiber surface of the glass fiber is protected by being coated with the fiber processing agent which is comprised of an epoxy resin and a rubber latex as described above, and hence the surface of the glass fiber comes to have an ample density and elasticity, and moreover not only the heat resistance but also the water resistance is excellent; a glass fiber is thus the fiber for which the special characteristics of the fiber processing agent can be utilized most effectively.

When treating a glass fiber with the fiber processing agent, it is preferable for the amount of attachment of the fiber processing agent to be 10 to 40 wt %, more preferably 20 to 30 wt %, in terms of solids relative to the weight of the glass fiber after the treatment. The reason for this is that if the amount of attachment is less than 10 wt %, then it becomes difficult for the fiber processing agent to spread all over the glass fiber surface evenly, whereas if the amount of attachment exceeds 40 wt %, then it becomes difficult to control the amount of attachment, and hence the fiber processing agent becomes prone to being attached to the glass fiber unevenly.

Moreover, there is no particular limitation on the type of the rubber that is reinforced by the glass fibers or fiber cords thereof; examples are chloroprene rubber, acrylonitrile-butadiene rubber, chlorosulfonated polyethylene rubber, hydrogenated nitrile rubber and so on. These types of rubber have good affinity to the fiber processing agent, and exhibit extremely high adhesiveness.

Moreover, in the case that the glass fibers treated with the fiber processing agent or fiber cords thereof are embedded in chlorosulfonated polyethylene or hydrogenated nitrile rubber, to further improve the adhesiveness to the rubber, it is preferable to further treat with an adhesive liquid containing a halogen-containing polymer, an isocyanate compound, carbon black, a cross-linking agent or the like.

In the rubber product manufactured as above, the glass fibers contained therein are covered by a dense film having ample elasticity, and hence there is no deterioration of the excellent tensile strength and heat resistance originally possessed by the rubber, and moreover the water-resistance is excellent; the rubber product is thus fit for prolonged use under a harsh environment.

Next, an example of the present invention will be described in detail.

EXAMPLE

The present inventor prepared a fiber processing agent comprised of 25 parts by weight of an epoxy resin aqueous dispersion (EPOLSION HC32, solid content 50 wt %), 30 parts by weight of a vinylpyridine-butadiene-styrene terpolymer latex (Nipol 2518FS, solid content 40 wt %), 30 parts by weight of a chlorosulfonated polyethylene latex (Esprene 200, solid content 40 wt %), and 60 parts by weight of water; moreover, alkali-free glass filaments of diameter 9 μm were spun, and several hundred of these were bound together using a binder, thus preparing 33.7-tex glass strands.

Next, glass fibers were made by combining 3 of the glass strands, and the fiber processing agent was applied to the glass fibers using an immersion method. Specifically, the fiber processing agent was applied such that the amount of solids attached was 20 wt % relative to the weight of glass fiber, and then drying was carried out at 250° C. for 2 minutes.

Next, the glass fibers onto which the fiber processing agent had been applied were subjected to primary twisting in the Z-direction (S-direction) of 2.1 twists per inch, 11 of the resulting fiber strands were combined to form a structure with 3 in the center and 8 on the outside, and secondary twisting was carried out in the S-direction (Z-direction) of 2.1 twists per inch, thus preparing ECG150 3/11 2.1S(Z) glass fiber cords.

Next, a halogen-containing polymer adhesive liquid was prepared by diluting Chemlok 402 (made by Lord Corporation, solid content 14.5 wt %) with xylene, and the halogen-containing polymer adhesive liquid was applied such that the amount of solids attached after application of the adhesive was 3.5 wt % relative to the weight of glass fiber cord, and drying was carried out. The glass fiber cords were embedded as a reinforcing material into rubber of the composition shown in Table 1, and a toothed belt (rubber product) of width 19 mm and length 980 mm was prepared.

TABLE 1

| Chemical | Parts by Weight |
|---|---|
| Hydrogenated Nitrite Rubber (ZETPOL 2020) | 100 |
| Carbon Black | 40 |
| Zinc Oxide | 5 |
| Stearic Acid | 1 |
| Thiokol TP-95 | 5 |
| Sulfur | 0.5 |
| Tetramethyl Thiuram Disulfide | 1.5 |
| Cyclohexyl Benzothiazolyl sulfenamide | 1 |

Next, each of the glass fiber cord and the toothed belt prepared as above were left for 504 hours under an environment at a temperature of 80° C. and a humidity of 95%, the tensile strength of each was measured before and after the test, and the retention rate H was calculated from formula (1):

$$H=(X_2/X_1)\times 100[\%] \quad (1)$$

Here $X_1$ represents the tensile strength before the test, and $X_2$ represents the tensile strength after the test.

Comparative Example

The present inventor prepared a fiber processing agent comprised of 30 parts by weight of a resorcinol-formaldehyde water-soluble condensate (solid content 8 wt %), 30 parts by weight of a vinylpyridine-butadiene-styrene terpolymer latex (Nipol 2518FS, solid content 40 wt %), 15 parts by weight of a dicarboxylated butadiene-styrene copolymer latex (Nipol 2570X5, solid content 40 wt %), 20 parts by weight of a chlorosulfonated polyethylene latex (Esprene 200, solid content 40 wt %), 1 part by weight of 25% ammonia water, and 4 parts by weight of water; glass fiber cords and a toothed belt were prepared by the same procedure and method as in the above example, and the tensile strength was measured. That is, a fiber processing agent having a resorcinol-formaldehyde water-soluble condensate as a principal component and not containing an epoxy resin was prepared, and the tensile strength was measured for each of a glass fiber cord and a toothed belt containing, i.e. having applied thereto the fiber processing agent.

Table 2 shows the tensile strength before and after the test $X_1$ and $X_2$ and the retention rate H for the glass fiber cords, and Table 3 shows the tensile strength before and after the test $X_1$ and $X_2$ and the retention rate H for the toothed belts.

TABLE 2

| | Tensile Strength Before Test $X_1$ (N) | Tensile Strength After Test $X_2$ (N) | Retention Rate H (%) |
|---|---|---|---|
| Example | 1000 | 900 | 90 |
| Comparative Example | 900 | 650 | 72 |

TABLE 3

| | Tensile Strength Before Test $X_1$ (N) | Tensile Strength After Test $X_2$ (N) | Retention Rate H (%) |
|---|---|---|---|
| Example | 11000 | 8500 | 77 |
| Comparative Example | 11000 | 6500 | 59 |

As is clear from Table 2 and Table 3, it was found that, because the glass fiber cord and the toothed belt of the comparative example were treated using a fiber processing agent not containing an epoxy resin, the water resistance was poor, and the heat resistance deteriorated, and hence the drop in the retention rate H was marked; in contrast, because the glass fiber cord and the toothed belt of the example were surface-treated with a fiber processing agent containing an epoxy resin, the water resistance was excellent and deterioration of the heat resistance was greatly suppressed, and hence dropping of the retention rate H could be suppressed to the utmost, and thus the durability could be improved.

Industrial Applicability

The fiber processing agent of the present invention has excellent water resistance and heat resistance, and also excellent flexibility, and can thus be used in rubber products that are repeatedly subjected to flexural stress under a poor environment of high temperature and high humidity.

What is claimed is:

1. A glass fiber having a fiber processing agent attached thereto, the fiber processing agent comprising a dispersion solution including a two-component dispersoid consisting essentially of a rubber latex and an epoxy resin selected from the group consisting of bisphenol A epoxy resin, bisphenol F epoxy resin, phenol novalac epoxy resin, cresol novalac epoxy resin, hydroquinone epoxy resin, brominated novalac epoxy resin, xylene-modified novalac epoxy resin, phenol glyoxal epoxy resin, tris-oxyphenol methane epoxy resin and bisphenol novalac epoxy resin, the fiber processing agent being attached to the glass fiber in an amount of 10 to 40 wt % in terms of solids.

2. The glass fiber as claimed in claim 1, wherein the rubber latex has a content of 35 to 95 wt %, and the epoxy resin has a content of 5 to 65 wt %.

3. The glass fiber according to claim 1, wherein the fiber processing agent is attached to the glass fiber in an amount of 20 to 30 wt % in terms of solids.

4. The glass fiber according to claim 3, wherein the epoxy resin is a bisphenol A epoxy resin.

5. The glass fiber according to claim 3, wherein the epoxy resin is a phenol novalac epoxy resin.

6. The glass fiber according to claim 1, wherein the rubber latex is at least one rubber latex selected from the group consisting of a butadiene-styrene copolymer latex, a dicarboxylated butadiene-styrene copolymer latex, a vinylpyridine-butadiene-styrene terpolymer latex and a chlorosulfonated polyethylene latex.

7. The glass fiber according to claim 4, wherein the rubber latex is at least one rubber latex selected from the group consisting of a butadiene-styrene copolymer latex, a dicarboxylated butadiene-styrene copolymer latex, a vinylpyridine-butadiene-styrene terpolymer latex and a chlorosulfonated polyethylene latex.

8. The glass fiber according to claim 5, wherein the rubber latex is at least one rubber latex selected from the group consisting of a butadiene-styrene copolymer latex, a dicarboxylated butadiene-styrene copolymer latex, a vinylpyridine-butadiene-styrene terpolymer latex and a chlorosulfonated polyethylene latex.

9. The glass fiber according to claim 1, wherein the rubber latex is a dicarboxylated butadiene-styrene copolymer comprising 20 to 80 wt % butadiene, 5 to 70 wt % styrene and 1 to 10 wt % of an ethylenic unsaturated dicarboxylic acid.

10. The glass fiber according to claim 1, wherein the rubber latex is a vinylpyridine-butadiene-styrene terpolymer latex comprising 10 to 20 wt % vinylpyridine, 60 to 80 wt % butadiene and 10 to 20 wt % styrene.

11. The glass fiber according to claim 1, wherein the rubber latex is a chlorosulfonated polyethylene latex in which there is a chlorine content of 25 to 43 wt % and a sulfur content of 1.0 to 1.5 wt %.

12. The glass fiber according to claim 1, wherein the rubber latex contains a vinylpyridine-butadiene-styrene terpolymer latex and a chlorosulfonated polyethylene latex.

13. The glass fiber according to claim 12, wherein the vinylpyridine-butadiene-styrene terpolymer latex comprises 10 to 20 wt % vinylpyridine, 60 to 80 wt % butadiene and 10 to 20 wt % styrene; and the chlorosulfonated polyethylene contains 25 to 43 wt % chlorine and 1.0 to 1.5 wt % sulfur.

14. A rubber product containing the glass fiber as claimed in claim 1.

15. A rubber product containing the glass fiber as claimed in claim 2.

16. A rubber product comprising (i) a rubber selected from the group consisting of chloroprene rubber, acrylonitrile-butadiene rubber, chlorosulfonated rubber, polyethylene rubber and hydrogenated nitrile rubber and (ii) the glass fiber according to claim 1.

17. A rubber product comprising (i) a rubber selected from the group consisting of chlorosulfonated polyethylene and hydrogenated nitrile rubber, (ii) the glass fiber according to claim 1 and (iii) an adhesive liquid containing a substance selected from the group consisting of a halogen-containing polymer, an isocyanate compound, carbon black and a cross-linking agent.

* * * * *